United States Patent [19]

Fürter et al.

[11] Patent Number: 4,561,736
[45] Date of Patent: Dec. 31, 1985

[54] EYEGLASS LENSES FOR PERSONS SUFFERING FROM SEVERE AMETROPIA

[75] Inventors: Gerhard Fürter, Aalen; Hans Lahres, Aalen-Wasseralfingen, both of Fed. Rep. of Germany

[73] Assignee: Carl-Zeiss-Stiftung, Heidenheim on the Brenz, Fed. Rep. of Germany

[21] Appl. No.: 518,380

[22] Filed: Jul. 29, 1983

[30] Foreign Application Priority Data

Aug. 7, 1982 [DE] Fed. Rep. of Germany ....... 3229577

[51] Int. Cl.$^4$ .......................... G02B 3/04; G02C 7/02
[52] U.S. Cl. ....................................... 351/159; 350/432
[58] Field of Search ................................ 351/168–172, 351/159; 350/432–435

[56] References Cited

U.S. PATENT DOCUMENTS 3,950,082  4/1976  Volk ..................................... 351/169
4,279,480  7/1981  Bettiol et al. ........................ 351/159

FOREIGN PATENT DOCUMENTS 0055878  7/1982  European Pat. Off. ............ 351/159
0084741  7/1978  Japan ................................... 351/159

Primary Examiner—John K. Corbin
Assistant Examiner—Scott J. Sugarman
Attorney, Agent, or Firm—Stonebraker, Shepard & Stephens

[57] ABSTRACT

Eyeglass lenses for persons suffering from severe ametropia. The lenses have a convexly shaped object-side front surface (4) and an eye-side rear surface (3) which is aspherically corrected in the central region (6) which comprises at least the main field of view. From this region the rear surface passes into a region in which its meridional inclination approaches the inclination of the front surface. The entire rear surface of the lens is continuously differentiable twice. Such a lens has an appearance which is fully satisfactory esthetically and makes it possible to keep the overall magnification of the system consisting of the eye and the eyeglass lens closer to 1 than in the case of previously known lenses. Aberrations are optimally corrected within a sufficiently large region, and no disturbing discontinuities in the fields of view occur.

8 Claims, 9 Drawing Figures

PRIOR ART

EYEGLASS LENSES FOR PERSONS SUFFERING FROM SEVERE AMETROPIA

The present invention relates to eyeglass lenses for persons suffering from severe ametropia, i.e. in the range above +6 diopters and below −6 diopters.

Eyeglass lenses in these ranges have serious disadvantages in the case of spherical development of both lens surfaces. In particular, lenses in the minus range have large edge thicknesses, and lenses in the plus range have large center thicknesses. In addition to the great weight of the lenses, this leads to optical defects. Certain object regions can not be seen at all in the edge regions of the plus lenses; certain object regions are seen double in the edge region of the minus lenses. In addition, there are large errors in imaging, particularly astigmatism and focusing errors, even with small viewing angles.

Recognizing the fact that with traditional eyeglass lenses of strong dioptric power it is in any event not possible to use the entire region of the lens for viewing, because of the imaging errors which occur, it has been proposed to decrease the disturbing lens thicknesses by reducing the optically usable diameter and providing the lens with a carrying border. This border then makes up the full diameter of the lens and is mounted in the eyeglass frame. With such a construction, the above mentioned optical non-uniformities occur even with small viewing angles, and the eyeglass lens is not esthetically pleasing. This is also true of what are called lenticular lenses, in which the thickness outside the optically usable diameter does not decline like a step but rather, after an inflection in the surface, continuously toward the edge.

There have been many attempts to make eyeglass lenses for persons suffering from severe ametropia more comfortable and esthetically more pleasing for the wearer. For example, in German Federal Republic Offenlegungsschrift (published application) No. 29 41 733, published on Apr. 24, 1980, and in the corresponding British application No. 2,032,647, published on May 8, 1980, lenses in the plus range are disclosed, with a convex aspherical front surface of rotational symmetry and a concave spherical or toric eye-side surface. In this way a lens is obtained in which the front surface, outside of the well-corrected optically usable diameter, passes continuously into the carrying border. In such lenses the central portion of the front surface has a strong convex curvature and passes toward the edge into a concave region. Since the lens thus protrudes far forward fron the frame, such eyeglass lenses are not esthetically pleasing.

German Federal Republic Offenlegungsschrift No. 29 42 216, published on Apr. 30, 1980, and the corresponding U.S. Pat. No. 4,279,480, issued on July 21, 1981, disclose eyeglass lenses in the minus range with aspherical front surfaces of rotational symmetry and concave spherical or toric rear surfaces. Also in these lenses, the front surface, outside of the well-corrected usable diameter, has a continuous transition into the carrying border. The front surface is concave at least in the corrected region, while its edge region is convex, so that such a lens is also not esthetically pleasing. Furthermore, these lenses have a strong demagnifying effect because of their relatively large distance from the cornea.

Also, there have recently been available on the market eyeglass lenses in the minus range having on the rear surface (eyeside surface) of an ordinary meniscusshaped minus lens with spherical surfaces, a lenticular hollowing. This lenticular hollowing is spherical and, depending on the correction, the diameter of this is from 20 to 40 mm. The edge of the lenticular hollowing passes continuously into the outer region or margin of the lens. For higher powers, such a lens offers only a small viewing field within which, due to the spherical development of the central part, aberrations are not optimally corrected.

SUMMARY OF THE INVENTION

The object of the present invention is to provide an eyeglass lens for persons suffering from severe ametropia which has an appearance, with acceptable thickness of the lens, which is esthetically entirely pleasing, and in which the aberrations are optimally corrected within a sufficiently large region, and in which no disturbing nonuniformities in the viewing fields occur, and in which the overall magnification is as close as possible to unity.

This object is achieved by providing an eyeglass lens wherein the objectside or front surface is convex and the rear surface is aspherically corrected in a central region which comprises at least the main field of view, with transition from there into a region in which its meridional inclination approaches the inclination of the convex front surface, the entire rear surface being continuously differentiable twice.

In the eyeglass lens of the invention, the front surface is convex, and thus affords the observer the same appearance as that to which he is accustomed from ordinary eyeglass lenses. Since at the same time the aspherically developed rear surface does not have any discontinuities or bends, the lens is entirely satisfying esthetically.

The esthetically pleasing development of the eyeglass lens means that, at least with higher astigmatic action, most of this defect of the eye is eliminated by a torus on the rear surface of the lens. For the correction of the aberrations which occur, such as astigmatism and focusing error, this surface must be developed atorically, as described for instance in German Federal Republic Offenlegungsschrift No. 30 16 936. Such an atorus requires a higher manufacturing expense than an asphere of rotational symmetry; however, it also makes optimum correction of the aberrations possible. In order to be able to keep the number of different atoric surfaces of a series of lenses within reasonable limits, it is possible to apply a slightly toric surface instead of the normally spherical front surface.

Therefore, in the new eyeglass lens, a higher cost of manufacture has been accepted with full realization of this fact, in order to develop the eyeglass lens in a manner which is esthetically fully satisfying and in all cases to obtain optimal correction of aberrations.

In these lenses, the front surface is developed as an asphere. In this way it is possible, relatively inexpensively, to develop the rear surface as a torus if the lens is to have astigmatic action. In this way, the result is obtained that the rear surface does not result in a high cost of manufacture as compared with the aspheric front surface, but this result must be obtained at the expense of the good correction obtained being made poor again by the toric rear surface. The same applies to eyeglasses without aspherical correction.

In contradistinction to this, in the lens of the invention only one surface, namely the aspherically or atorically developed rear surface, serves for the optimal correction of aberrations, the esthetically pleasing appearance of the lens being retained in all cases.

With the eyeglass lens of the invention, the rear surface can be developed aspherically in order to make the astigmatism zero. Any small focusing error which then remains can be compensated for by accommodation. In the case of plus lenses for persons suffering from aphakia this is of course no longer meaningful so that here the correction is carried out with the goal of keeping the astigmatism as well as the focusing error as small as possible. With the traditional aspheres this means that the tangential error is made equal to zero.

The main viewing field covers a viewing angle up to about 20 degrees. In the eyeglass lens of the invention, in the minus range the optically usable diameter is made so great that an object-side viewing angle of 30 degrees is assured. In the plus range, the optically usable diameter is so selected that an object-side vieiwing angle of about 20 degrees is assured.

Starting with this diameter, the eye-side surface passes in a twice continuously differentiable fashion into a region in which its meridional inclination approaches the inclination of the convex front surface. In this connection, "approaches" means that the difference in the inclinations is not greater than in spherically developed lenses of weak power. By this means, the prismatic action is kept very small and the gap in field of view or the so-called image jump is greatly reduced or even made equal to zero.

If the ametropia of an eye is corrected by an eyeglass lens, then the system consisting of the eyeglass lens and the eye has a certain overall magnification, with the result that the person wearing the eyeglasses, particularly in the case of lenses of higher dioptric power, does not perceive objects within the field of view in their true size. This overall magnification V is calculated by the following equation.

$$V = \frac{1}{1 - e^* S'} \times \frac{1}{1 - \frac{d}{n} \cdot D_1} \quad (1)$$

In this equation:
$e^*$ = the distance of the vertex of the eyeglass lens from the front principal point of the eye.
$S'$ = dioptric power of the eyeglass lens in diopters.
$d$ = center thickness of the eyeglass lens.
$n$ = index of refraction of the lens material.
$D_1 = (n-1)/r_1$
$r_1$ = radius of the front surface of the lens.

The first factor of this equation is known as the system magnification, and the second as inherent enlargement.

By means of the eyeglass lens of this invention, it is possible to correct even eyes suffering from severe ametropia and at the same time to reduce the disadvantage of the change in perception of size as compared with previously known eyeglass lenses.

In the minus range, the distance $e^*$ can be kept small by the slight edge thickness of the lens, so that the overall magnification V can be kept closer to 1 than in previously known eyeglass lenses.

In the plus range, the invention makes it possible to reduce the center thickness d and to keep the curvature $D_1$ of the front surface small. In this way it becomes possible, also in this region, to keep the overall magnification V closer to 1 than in the previously known lenses.

If the new eyeglass lens of this invention is developed as a plus lens, then it is advantageous, especially in the case of higher dioptric powers, to give a convex shape to the corrected region of the aspherical back surface, so as to attain optimal reduction of the thickness and thus of the overall magnification V. The meridian section of such a lens then has the shape of a double flat S on the eye side. If the optically usable diameter is somewhat further reduced, e.g. to a value of 35 mm, one obtains a lens which is very much thinner, and therefore also lighter, than known comparable eyeglass lenses.

DETAILED DESCRIPTION

Figure 1A:
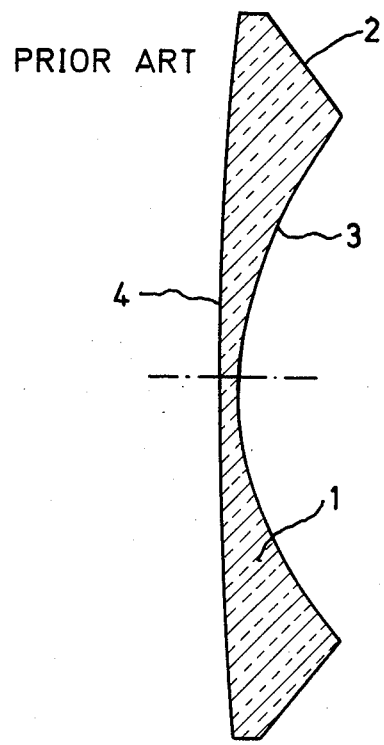
FIG. 1a is a diagram of an eyeglass lens having a power of −14 diopters, developed as a lenticular lens.

The known eyeglass lens 1 illustrated in FIG. 1a has a lenticular grinding 2 in order to reduce the edge thickness. The rear and front surfaces 3 and 4 are spherical. As can be readily seen, such a lens does not satisfy esthetic demands. To an observer, it displays the so-called "bottom of the bottle" effect.

Figure 1B:
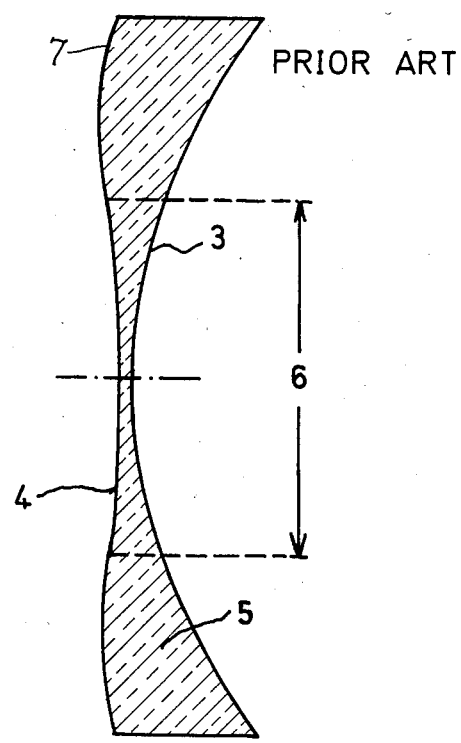
FIG. 1b illustrates a lens of the same dioptric power, developed in accordance with the above mentioned Offenlegungsschrift No. 29 42 216.

FIG. 1b shows a known form of lens 5, in which the rear surface 3 is spherical while the front surface 4 has the shape of an asphere of rotational symmetry. The optically usable diameter is designated 6. Within this region, the eyeglass lens is corrected; outside, on the other hand, it passes, within an optically uncorrected region, continuously into the carrying border 7.

This lens also is not esthetically pleasing, since the fact that the front surface 4 is hollow in its central region and bead-shaped at its edges is esthetically disturbing.

Figure 2:
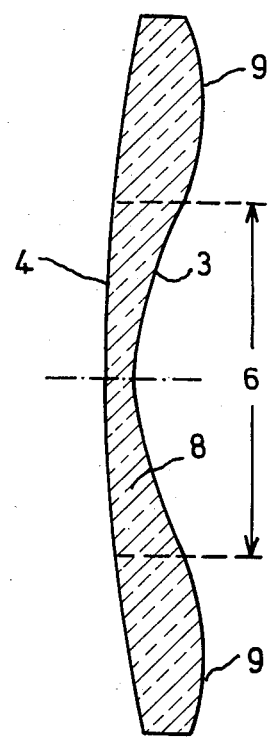
FIG. 2 shows a lens also of −14 diopters, developed in accordance with the present invention.

FIG. 2 illustrates an eyeglass lens 8 designed in accordance with the present invention. The front surface 4 of this lens is spherical, while the rear surface 3 is developed as an asphere. The diameter 6 is the optically usable region, within which aberrations are optimally corrected. Such optimal correction can be obtained in all cases by shaping the rear surface 3, even when the lens is to have an anistigmatic action.

The surface 3 in the optically usable region 6 may be an asphere of symmetry of rotation if the lens does not have astigmatic action. In this case the region 9 extends over the entire diameter symmetrically toward the carrying border. If the lens is to have an astigmatic action, then the surface 3 is developed as an atorus. Even then, it is possible to keep the carrying border of the same thickness over its entire circumference and to make the sharply focusing region 6 circular by developing the region 9 asymmetrically.

As can be noted by a comparison of FIG. 2 with FIG. 1b, the lens 8 designed in accordance with this invention can be brought closer to the eye of the user than the known lens 5, so that the value e* becomes smaller and thus the system magnification as well as the total magnification V are brought closer to a value of 1.

Figure 3A:
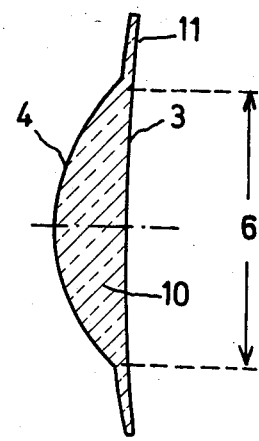
FIG. 3a shows a lens with a power of +18 diopters, developed as a lens with a carrying or mounting border.

In the case of the known lens 10 in the plus range, illustrated in FIG. 3a, a relatively thin carrying border 11 is provided outside the optically usable diameter 6. The rear and front surfaces 3 and 4 are spherical. It can be readily seen that such an eyeglass lens does not satisfy esthetic and optical demands.

Figure 3B:
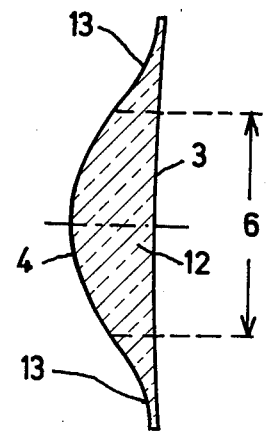
FIG. 3b illustrates a lens of the same power, developed in accordance with the above mentioned Offenlegungsschrift No. 29 41 733.

The known eyeglass lens 12 shown in FIG. 3b has a rear surface 3 which is spherical, while the front surface 4 has the shape of an asphere. Outside of the optically useful diameter 6, the front surface passes continuously into the border 13, the curvature of the surface 4 changing. This surface 4, strongly convex in its central region, passes in its outer region into a concave curvature. This is the reason why such a lens is also esthetically unpleasing.

Figure 4:
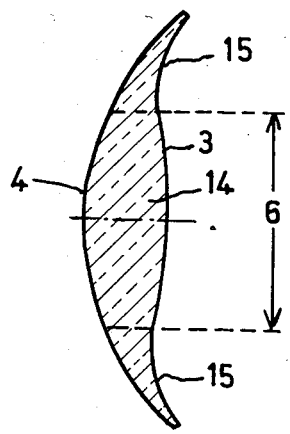
FIG. 4 shows a lens of +18 diopters developed in accordance with the present invention.

FIG. 4 illustrates an eyeglass lens 14 according to this invention, having the same dioptric power and made of the same material (allyl diglycol carbonate CR 39) as the known lens of FIG. 3b. Both lens surfaces 3 and 4 have a convex shape in the region of the optically usable diameter 6; i.e., the lens is of bi-form shape. The front surface 4 is convexly spherical, while the rear surface 3 is aspherical with a convex course in the region of the diameter 6 and a concave course in the marginal region 15. Within this region, the meridional inclination of the rear surface 3 approaches the inclination of the spherical front surface 4, this transition being continuous. The rear surface 3 is continuously differentiable twice. Its meridian section has the shape of a double flat figure S.

As shown by a comparison of FIGS. 3a and 3b with FIG. 4, the front surface 4 of the bi-form is substantially flatter than those of the other lenses. Such a flat front surface has the advantage that the forward protrusion with respect to the eyeglass frame is slight, so that such eyeglasses offer a pleasing appearance for an observer.

Furthermore, in the case of the lens of FIG. 4, the center thickness can be kept less than that of known shapes, so that the lens is lighter. A saving in weight of about 10 percent is obtained as compared with the lens of FIG. 3b.

The reduced center thickness and the flatter development of the front surface provide the advantage, in accordance with the above equation (1), that in the bi-form of FIG. 4 the inherent magnification and thus the overall magnification V are considerably reduced as compared with previously known shapes. This provides the user with a very substantial advantage, which is perceptible also from an esthetic standpoint.

Figure 5:
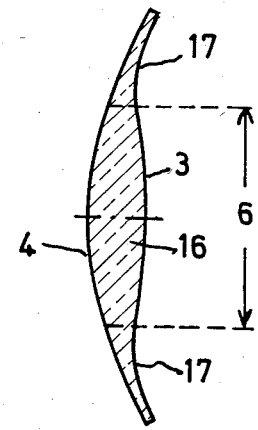
FIG. 5 illustrates another example of a lens also of a power of +18 diopters, also developed in accordance with this invention.

A further substantial reduction in the center thickness and in the curvature of the front surface is possible if the lens is made from silicate glass, for instance from the glass sold by the Schott glass firm under the designation BaSF 64. A lens 16 made of this glass is shown in FIG. 5. In this lens also, the rear surface 3 is convex in its central region 6, the shape passing into a concave course in the region 17.

Some data of the bi-form eyeglass lenses of this invention, illustrated in FIGS. 4 and 5, are compared with the data of a known lens according to FIG. 3b in the following table for plus lenses of a dioptric power of +18 diopters.

|  | Known Lens (FIG. 3b) | Bi-form (FIG. 4) | Bi-form (FIG. 5) |
| --- | --- | --- | --- |
| Material | CR 39 $n = 1.501$ | CR 39 $n = 1.501$ | Silicate glass $n = 1.706$ |
| Outside diameter | 67 | 66 | 66 |
| Center thickness d | 13.6 | 12.3 | 8.6 |
| Radius of the front surface $r_1$ | 29.70 | 43.74 | 61.39 |
| Radius of the rear surface $r_2$ | 268.27 | −94.81 | −121.89 |
| Inherent magnification | 1.18 | 1.10 | 1.06 |
| System magnification | 1.35 | 1.35 | 1.35 |
| Overall magnification V | 1.60 | 1.49 | 1.43 |

All dimensions are given in millimeters. In the case of an aspherical development of the surface in question the radii $r_1$ and $r_2$ are the radii of curvature in the center of the lens.

A series of eyeglass lenses must cover a very wide range of dioptric powers, which also includes the region of severe ametropia defined earlier. For dioptric powers which lie outside the region of severe ametropia, eyeglass lenses are customarily developed in meniscus shape, i.e., with convex front surface and concave rear surface.

If the plus lenses were developed as bi-forms in accordance with FIGS. 4 and 5 for the entire range of severe ametropia, it might happen that a patient whose eyes are of different hyperopia might have, for the correction of his ametropia, eyeglasses one lens of which is of meniscus shape while the other has a bi-form. Such glasses would not be satisfactory esthetically since the bi-form is less strongly curved on the front surface than the meniscus.

For this reason, it is advantageous to provide also meniscus-shaped eyeglass lenses within the initial portion of the range of severe ametropia. These lenses are developed in accordance with the invention, i.e., the rear surface is aspherical. By means of aspherical or atoric surfaces, it is possible to correct the aberrations with any curvature of the surface, so that both a meniscus-shaped and a bi-form shape of lens is possible for correction of the same aberrations.

Figure 6:
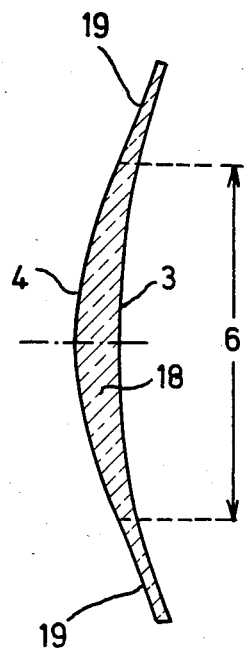
FIG. 6 shows a lens with a power of +6 diopters developed in accordance with the above OS No. 29 41 733.
Figure 7:
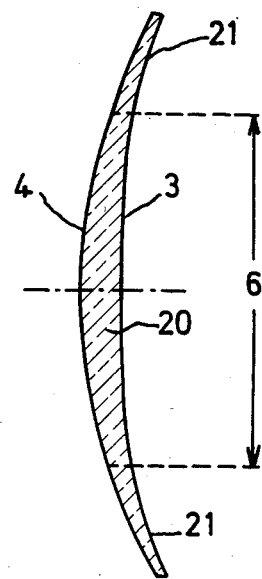
FIG. 7 illustrates an eyeglass lens with a power of +6 diopters, developed in accordance with the present invention and made of the same material as the lens of FIG. 6.

One illustrative embodiment of a meniscus-shaped lens developed in accordance with the invention and having a power of +6 diopters is shown in FIG. 7. A lens of the same +6 power developed in accordance with the above mentioned OS No. 29 41 733 is shown in FIG. 6. This known lens 18 has a front surface 4 which is more strongly curved in its central region than the front surface of the new lens 20 in FIG. 7. Furthermore, the curvature of the known lens 18 changes upon transition from the central region into the outer region 19. In the new lens 20 of FIG. 7, the rear surface 3 is more strongly curved in the region of the edge 21 than in the central region 6. In this edge region 21, the inclination of the rear surface 3 approaches that of the front surface 4.

Since the front surface 4 of the lens of FIG. 7 is flatter than that of the lens of FIG. 6 and the value $D_1$ is therefore smaller, the total magnification V is less than in the known lens of FIG. 6.

It can be noted from FIGS. 2, 4, 5, and 7 that in all eyeglass lenses developed in accordance with the invention, the curvature of the rear surface 3 outside of the optically usable central region 6 is relatively great. This reduces the so-called "rear-mirror effect", i.e., visibility of objects of strong brightness reflected on the back surface, which is disturbing to the wearer of the glasses. Such disturbing mirroring effects, on the other hand, are present in the known eyeglass lenses such as those illustrated in FIGS. 1a, 1b, 3a, and 3b. This property of the new lenses of the present invention, in reducing the rear-mirror effect, therefore also increases the comfort of the wearer.

The important feature that the eye-side surface of the lens is continuously differentiable twice, serves to distinguish the present lens from those lenses in which a radial section of the eye-side surface has two curves having a common point of tangency and having respective radii which, at that point of tangency, are unequal in either magnitude to more than a substantially infinitesimal extent, or sign (plus or minus), or both. Such curves having the inequalities or differences just mentioned, at a common point of tangency, can not be continuously differentiable twice, within the meaning of that term as here used, and when such curves are used on eye-side eyeglass surfaces, the wearer's observed image will appear to "jump" in magnification or in image quality when the line of sight moves across any point of tangency of such two curves. But, as already indicated, no such jump in image occurs when using the curvatures of the present invention. This expression "continuously differentiable twice" means that the second derivative of the curve is continuous; that is, that the second derivative is a continuous function without steps.

What is claimed is:

1. An ophthalmic lens for persons suffering from severe ametropia, said lens having:
   (a) a convex object-side front surface and an eye-side rear surface;
   (b) said rear surface consisting of:
   (c) a central region;
   (d) a surrounding outer region; and
   (e) a transition region between said central region and said outer region;
   (f) said central region being developed as a surface chosen from the group consisting of aspherically developed surfaces of revolution and atorically developed surfaces, for optimal correction of aberrations;
   (g) said central region having a diameter such that it provides a wearer with an object-side viewing angle of at least 20 degrees;
   (h) said transition region having a rear surface of such curvature that the entire rear surface of said lens, including said central region and said outer region and said transition region, is continuously differentiable twice, in the sense that the second derivative of the curvature is a continuous function without steps, and the rear surface, in radial cross section, forms a smooth curve without any abrupt change in curvature.

2. The invention defined in claim 1, wherein said rear surface within said transition region is of such shape that the rear surface of said outer region has an inclination which approaches that of the front surface.

3. The invention defined in claim 1, wherein said front surface is convexly spherical.

4. The invention defined in claim 1, wherein said central region of said rear surface is developed as an asphere of rotational symmetry.

5. The invention defined in claim 1, wherein said central region of said rear surface is developed as an atorus.

6. The invention defined in claim 1, wherein said central region of said rear surface is aspherically corrected up to an object-side viewing angle of about 30 degrees.

7. The invention claimed in claim 3, wherein said lens is of strongly positive power and said rear surface has a convex shape within its corrected central region.

8. The invention defined in claim 7, wherein said lens has a median section which, on its rear side, has the shape of a double flat S.

* * * * *